March 11, 1969

D. A. KOHL 3,432,749

DATA CORRELATING DEVICE AND PROCESS UTILIZING
A RECIPROCATING MEMBER

Filed Aug. 26, 1963

INVENTOR.
DOUGLAS A. KOHL
BY Robert B. Hughes

ATTORNEY

INVENTOR.
DOUGLAS A. KOHL
BY Robert B. Hughes
ATTORNEY

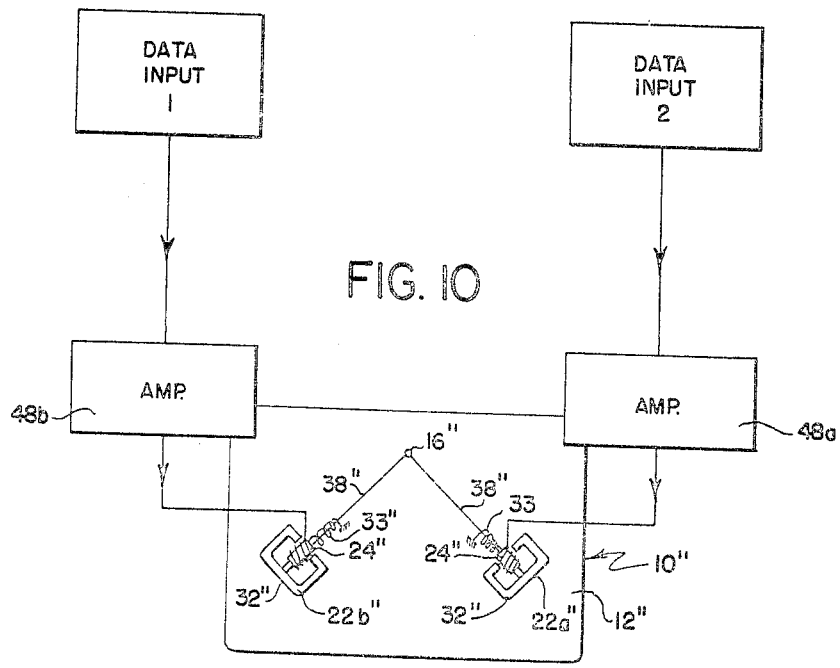
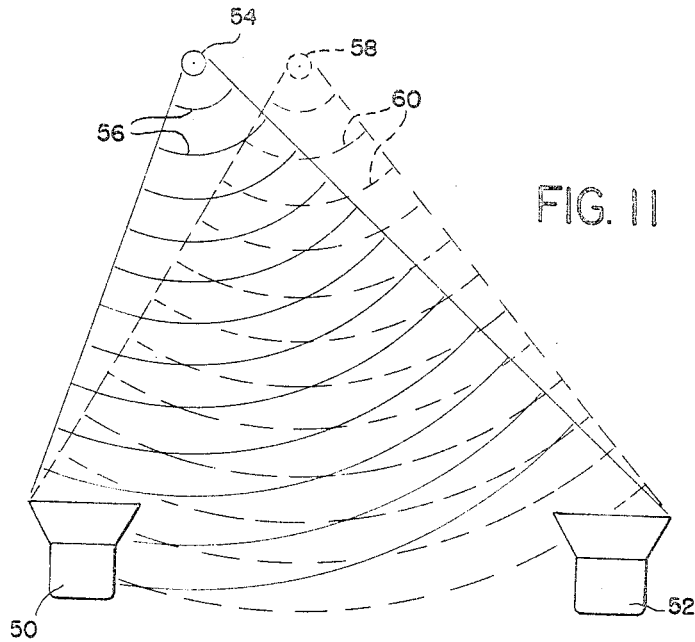

United States Patent Office 3,432,749
Patented Mar. 11, 1969

3,432,749
DATA CORRELATING DEVICE AND PROCESS UTILIZING A RECIPROCATING MEMBER
Douglas A. Kohl, Osseo, Minn., assignor, by mesne assignments, to Litton Systems, Inc., Beverly Hills, Calif., a corporation of Maryland
Filed Aug. 26, 1963, Ser. No. 304,519
U.S. Cl. 324—140
Int. Cl. G01r 7/00
10 Claims

ABSTRACT OF THE DISCLOSURE

A data correlating system including an indicator driven in a plane by a plurality of reciprocating electromagnetic units, each energized by an input signal. The electromagnetic units are disposed at an angle with respect to each other and energized either in phase or out of phase.

This invention relates to a method and apparatus for comparing two or more sets of data.

The situations where it is desirable to make comparisons between various sets of data are numerous and varied. For example, to ascertain the direction of a source by the sounds emitted therefrom, the sound waves are picked up by two or more receivers which are physically spaced from one another, and the phase relationship of the waves as picked up by the receivers gives the desired information. As another instance, seismographic work requires the study and comparison of shock waves picked up at various receiver stations. Also, to interpret many types of experimental data, it is necessary to make various correlations between sets of data. Obviously for many applications, it is necessary to have rather complex apparatus to make more sophisticated comparisons between sets of data, but other situations exist where such is not warranted nor required.

Accordingly, it is an object of the present invention to provide a simple apparatus and process whereby various correlations between sets of data, such as equal coincident values, zero points, relative magnitudes, equal or near equal frequencies, etc., can be quickly and easily ascertained.

FIGURE 10 is a view similar to FIGURE 1 showing a third embodiment of my invention, and FIGURE 11 is a schematic drawing illustrating a practical application of this third embodiment of my invention.

Figure 1:
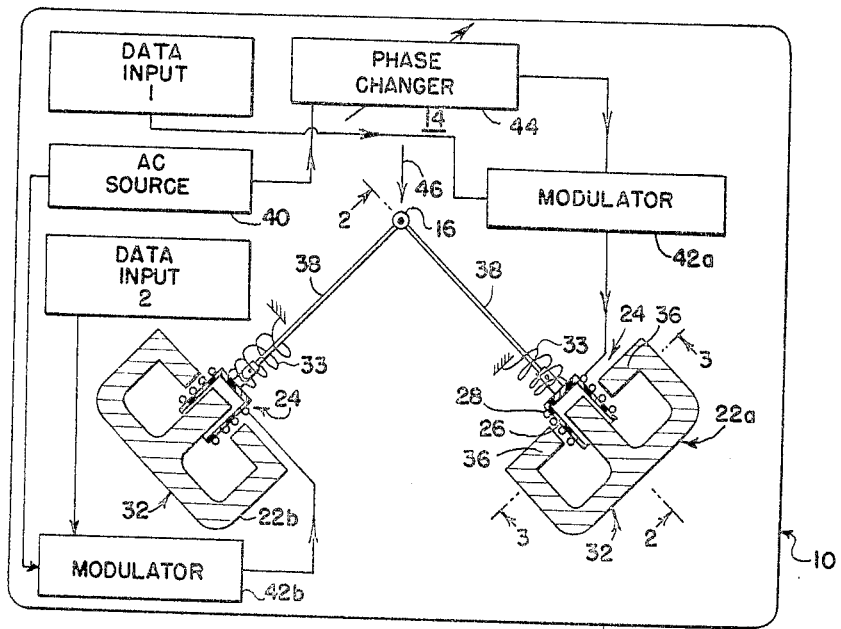
FIGURE 1 is a top plan, partially schematic view, with portions thereof in section, showing an apparatus embodying preferred teachings of my invention.
Figure 2:
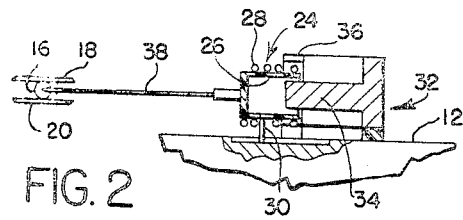
FIGURE 2 is a sectional view taken on line 2—2 of FIGURE 1.
Figure 3:
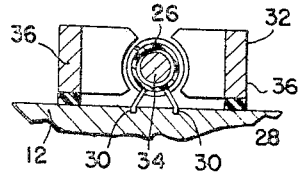
FIGURE 3 is a sectional view taken on line 3—3 of FIGURE 1.

Referring to FIGURES 1–3, numeral 10 designates generally the apparatus comprising a base or housing 12 presenting a front display area 14. Centrally mounted in this display area 14 so as to be easily observable from a position in front of the apparatus 10 is an indicator 16 which, as shown herein, is a small ball or other object.

This indicator ball 16 is mounted for reciprocating or cyclic horizontal motion along paths having both longitudinal and transverse components with respect to a line indicated at 46. Such a mounting can conveniently be accomplished (as shown herein) by locating the indicator ball 16 between upper and lower horizontal plates 18 and 20 which are supported from the base 12, and for convenience are shown only in FIGURE 2.

Mounted on opposite sides of the base 12 are two drive units 22a and b, respectively, each of which imparts to the indicator ball 16 a component of reciprocating horizontal motion. These units 22a and b are so arranged that these components of motion slant inwardly and forwardly toward each other to make equal angles with the longitudinal axis (i.e. reference axis) of the apparatus, these angles desirably being approximately 45 degrees. In the particular embodiment shown herein, each of the units 22a and b comprises a piston member 24 made up of a shell 26 which is wrapped with a coil 28 and is mounted, as at 30, for reciprocating linear motion along a line parallel to the longitudinal axis of its related shell 26. To create a proper magnetic field about each coil 28, there is provided a respective magnet 32 comprising a center portion 34 extending into the shell 26 and two arms 36 reaching on either side thereof, each piston being yieldingly held in the desired position by a related spring 33 mounted from the housing 12. Each unit 22a or b has a piston rod 38 pivotally connected at the rear to the front end of the shell 26 and pivotally connected at the front to the indicator ball 16. These rods 38, each being aligned with the component of motion imparted by its related piston 24, make equal angles with the longitudinal axis of the apparatus.

According to the first embodiment of the present invention, the coils 28 are each excited with a respective alternating current having the same frequency as the other, which frequency is desirably within an observer's flicker frequency (which for most humans is between 15 to 20 cycles per second). It is at this frequency of oscillation that any oscillating motion of an object becomes most noticeable. The strength or amplitude of the alternating current supplied to each coil 28 is made proportional to the values of its respective one of the two inputs which are to be compared. Thus when one of these inputs is of a fixed value, its related piston 24 will simply oscillate at the same constant amplitude and this amplitude will vary proportionally when the value begins to change.

Apparatus which translates an input or a set of data into an alternating current whose amplitude is proportional to values of this data are numerous and varied, and are well known in the prior art; hence one such apparatus is only indicated schematically herein. As illustrated in FIGURE 1, alternating current of the desired frequency is fed from a suitable alternating current source 40 to the coil 28 of each of the units 22a and b. The amplitude of the current to each of the units 22a and b is controlled by a respective one of two modulators 42a and b, each of which is made responsive to a respective one of two sets of data which are to be compared. So that the phase relationship of the currents to the units 22a and b can be varied, a phase changer 44 is operatively connected to one of the units (which as shown herein is 22a).

Figure 4:
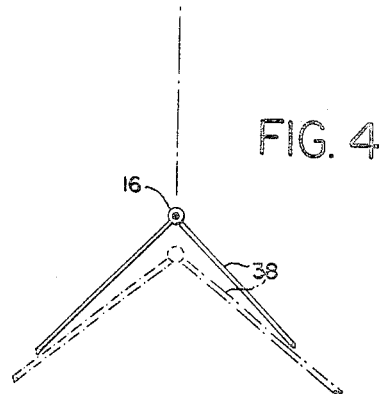
FIGURES 4 through 7 are schematic illustrations showing various operating conditions of my invention.

In operation, the observer faces himself in front of the display area 14 so that his line of vision (indicated by longitudinal line 46) is directed toward, and is longitudinally aligned with, the indicator ball 16. The A.C.

source 40 is activated so that alternating current of a predetermined frequency (as before stated, desirably between fifteen to twenty cycles per second) is fed to each of the coils 28, and two inputs or sets of data (e.g. a pair of readings from two instruments, etc.) are fed each into a related one of the two modulators 42a and b, which makes the amplitude at any one time of its related current proportional to the value of its input at such time. If it is desired to find equal coincident values of the two inputs, the phase changer 44 is adjusted so that the two pistons 24 reciprocate in phase. If coincident values of the two inputs are equal, the components of reciprocating motion of the pistons 24 of the units 22a and 22b will be equal, as well as in phase. Since these two components of reciprocating motion make the same angle with the longitudinal axis of the apparatus, the resultant of these two equal components of reciprocation (which is the resultant path of the indicator ball 16) will be a reciprocating path parallel to the longitudinal axis of the apparatus 10 (as shown in FIGURE 4). Hence to the observer who is longitudinally aligned with the indicator ball 16, there will be no apparent motion, and the indicator ball 16 can be seen distinctly by the observer.

Figure 5:
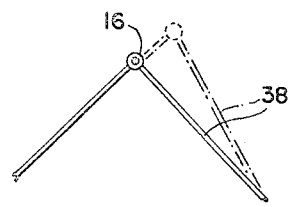
Figure 6:
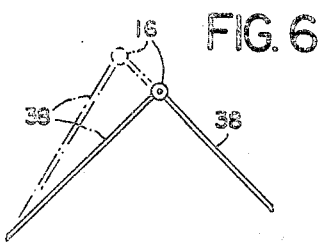

However, if coincident values of the inputs are not equal, the amplitude of the piston 24 of one of the drive units 22a or b will be greater than that of the other, and the resultant oscillating motion of the indicator ball 16 will have a transverse reciprocating component. To an observer longitudinally aligned with the indicator ball 16, this ball 16 will be seen to oscillate. To illustrate this, the resultant path of the ball 16 is shown first in FIGURE 5 with the piston 24 of unit 22a having zero amplitude and piston 24 of unit 22b oscillating, and then in FIGURE 6 with piston 24 of unit 22b having zero amplitude and that of unit 22a oscillating. Since as before stated, these oscillations of the ball 16 will be within the flicker frequency of the observer, such a transverse component of oscillation will be readily discernable.

When the values from both sets of data are zero, the two pistons 24 will be stationary, and again there will be no apparent (nor in this circumstance actual) motion of the indicator ball 16. Thus, all equal coincident values (from zero to maximum) will be detected by the apparent, and in the case of coincident zeros actual, lack of motion of the indicator ball 16.

It should be noted that when it is desired to find coincident values of a certain proportion to each other, the observer need merely shift his line of sight to the ball 16. Thus only when the values of the two inputs (and consequently the amplitudes of the pistons 24) are at a predetermined ratio, will the resultant path of reciprocation of the ball 16 be aligned with the observer's line of sight so that the ball 16 will appear motionless.

Figure 7:
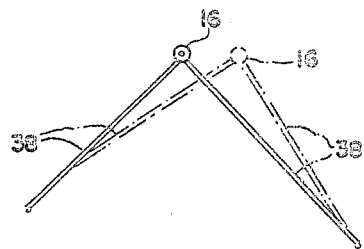

When it is desired to ascertain only coincident zeros from the two sets of data, the phase changer 44 is so manipulated as to excite the coils 28 out of phase with one another. Under these circumstances, when there is motion of either piston, or even when the oscillations of the two pistons 24 are of equal amplitude (as shown in FIGURE 7), the indicator ball 16 will oscillate along a path having a transverse component and thus become indistinct. Only when neither of the pistons 24 are reciprocating, will the indicator ball 16 become distinct and appear to be motionless.

Figure 8:
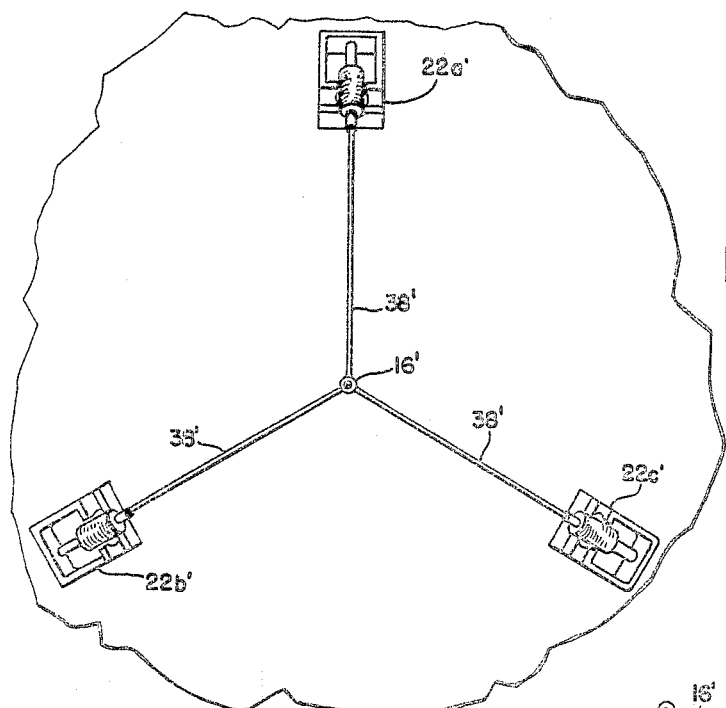
FIGURE 8 is a top plan, partially schematic illustration of a second embodiment of my invention.
Figure 9:
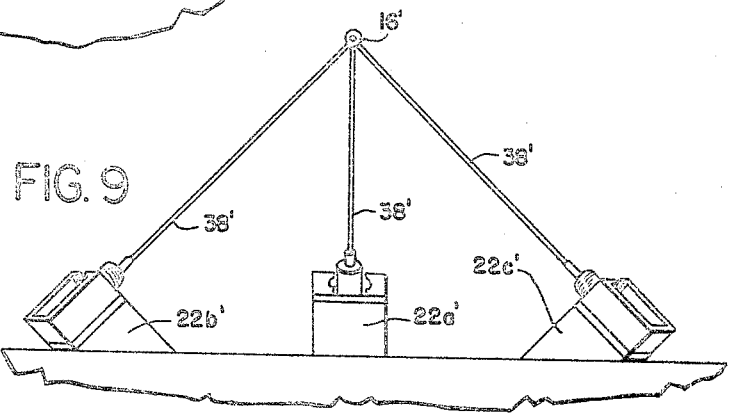
FIGURE 9 is a side elevational view thereof.

A second embodiment of my invention is indicated schematically in FIGURES 8 and 9, wherein are shown three drive units designated 22a', 22b', and 22c', respectively, each of which is constructed similarly to either of the aforedescribed units 22a or 22b. Each of these units 22a', b', and c' are connected by a respective rod 38' to an indicator ball 16', and are spaced symmetrically about the longitudinal axis of the apparatus and are positioned with respect to this longitudinal axis (which, in this embodiment, is vertically disposed), so as to impart a component of reciprocating motion to the ball 16', which component makes an angle of approximately 45 degrees with said longitudinal axis. The mode of operation of this second embodiment is substantially the same as that of the first embodiment, with a respective alternating current being fed to each of the units 22a', b', and c', and being modulated according to a respective one of three sets of data will reciprocate the ball 16' along the longi- excited in phase, coincident equal values from all three sets of data will recipracate the ball 16' along the longitudinal axis (with which the observer is aligned) so that the indicator ball 16' appears to be motionless. When the units 22a', b', and c' are excited out of phase, only coincident zeros will make the indicator ball 16' appear motionless. Also by the observer changing his line of sight, coincident values of a certain ratio will become apparent.

A third embodiment of the present invention is illustrated schematically in FIGURE 10. Components of this third embodiment which have substantially the same physical construction as those of the first embodiment will be given like numerical designations, with a double (″) prime distinguishing those of the third embodiment. Thus it can be seen that the apparatus 10″ has a housing 12″ supporting two units 22a″ and 22b″, each of which has a piston 24″ operatively disposed with respect to a related magnet 32″ and yieldingly retained at such position by a related spring 33″. Each piston 24″ is pivotally connected through a respective rod 38″ to an indicator ball 16″.

The apparatus of this third embodiment differs from that of the second embodiment in that each of two sets of data, in the form of an electrical voltage, is amplified (an amplifier being shown schematically for each of the units 22c″ and 22b″ at 48a and 48b, respectively), and then fed directly to the coil 28″ of a respective unit 22a″ or 22b″. Thus the displacement of either of the pistons 24″ (being resisted by its respective spring 33″) will be proportional to the magnitude of its related signal (i.e. the value of its respective set of data at any one time). Accordingly, when one set of data is at a constant level, its respective piston 24″ will be displaced to a certain position and remain there until the value of its respective set of data increases or decreases to effect a respective increase or decrease in the displacement of the piston 24″.

Various comparisons can be made by use of the apparatus of this third embodiment. For example, assume that one unit 22a is fed with a known input which is a sine wave of 100 cycles per second, and an unknown set of data, the character of which is to be ascertained, is fed into the other unit 22b. As the frequency of the unknown input comes sufficiently close to that of the known input so that the beat frequency of the two inputs approaches the flicker frequency of the observer, this occurrence will become quite evident in the character of the oscillations of the ball 16″. That is to say, while each unit 22a″ and 22b″ will be contributing components of oscillation of a frequency much higher than the beat frequency, on every "beat" the ball 16″ will be oscillating only longitudinally and appear distinct (provided the strength of the two inputs are equal), and between such beats the ball 16″ will have a transverse component of oscillation and thus appear blurry and indistinct, or if the oscillations are large enough, will hardly be visible. For example, with one input having a frequency of one hundred cycles per second and the other in approaching that frequency has arrived at a frequency value of one hundred and ten cycles per second, the ball 16″ will be oscillating only longitudinally and thus appear clear and distinct ten times a second, and will be blurry between these times. As the two frequencies approach one another, the beat frequency will become lower and the periods of distinctness more prolonged and less frequent, until, with both inputs the same frequency, the ball 16″ will constantly be reciprocating only longitudinally and thus appear to be motionless. As in the previous embodiment, the amplitude of these two inputs can readily be compared merely by the observer shifting his line of sight with respect to the longitudinal axis of the device.

Another application of the present invention is illustrated in FIGURE 11, wherein are shown a pair of hydrophones 50 and 52 mounted, for example, on a submarine. When sound waves are emitted from a source (as indicated schematically at 54) not equidistant from the hydrophones 50 and 52, the sound waves (indicated in solid lines at 56) reaching the hydrophones 50 and 52 will not be in phase. By operatively connecting each of the units 22a'' and 22b'' to a respective one of the hydrophones 50 or 52, the phase relationship of the sound waves reaching the hydrophones can easily be ascertained. However, when the sound source reaches a location shown at 58, the sound waves emitted therefrom (shown in broken lines at 60) will reach the hydrophones 50 and 52 at the same time and hence will be received in phase, with the result that the units 22a'' and 22b'' will oscillate in phase with the indicator ball 16'' oscillating longitudinally and thus being apparently motionless. By providing a plurality of the devices 10'' and mounting them in proximity to one another, and connecting them in various combinations to a number of hydrophones properly located about the submarine, the direction of travel of sound reaching the submarine could be readily ascertained visually by a person observing the various units 10''. It should be noted that not only would these units 10'' indicate direction, but by observing the amplitude of the oscillations of the indicator ball 16'', the intensity of the sound could be roughly ascertained.

Another facet of the present invention is that the distinctness of the ball 16'' depends not only on the frequency of oscillation of the ball 16'', but also on the linear velocity of the transverse component of motion. Thus, for example, very rapid oscillations having a small transverse component will make the ball 16'' fuzzy and indistinct but discernable, while a large transverse component of oscillation (and hence a high linear transverse velocity) at a somewhat lower frequency will make the ball 16'' less discernable. Thus, near coincidences of nearly any frequency could be ascertained.

Now therefore I claim:

1. A method for comparing at least two inputs, comprising the steps of:
   providing an indicator element capable of being displaced within a region of movement;
   causing the indicator element to be reciprocally displaced along a predetermined first path component in said region at a predetermined frequency and in response to a first input;
   causing the indicator element to be reciprocally displaced along a predetermined second path component in said region at said predetermined frequency and in response to a second input;
   controlling said reciprocating displacements along said first and second path components so that the amplitude of each such component at any one time is related to the respective input for that component at such time; and
   causing said reciprocating displacements to be in phase with each other so that coincident related values of said inputs are visually evidenced by related movement of the indicator element within said region.

2. The method as in claim 1 wherein said predetermined frequency is within the range of approximately 15 to 20 cycles per second, inclusive.

3. A method for comparing at least two inputs, comprising the steps of:
   providing an indicator element capable of being displaced within a region of movement;
   causing the indicator element to be reciprocally displaced along a predetermined first path component in said region at a predetermined frequency and in response to a first input;
   causing the indicator element to be reciprocally displaced along a predetermined second path component in said region at said predetermined frequency and in response to a second input;
   controlling said reciprocating displacements along said first and second path components so that the amplitude of each such component at any one time is related to the respective input for that component at such time; and
   causing said reciprocating displacements to be out of phase with each other so that coincident zero values of said inputs are visually evidenced by related movement of the indicator element within said region.

4. The method as in claim 3 wherein said predetermined frequency is within the range of approximately 15 to 20 cycles per second, inclusive.

5. Apparatus for the correlation of plural inputs, comprising:
   an indicator;
   means mounting said indicator to permit movement of said indicator along at least a first axis and a second axis positioned substantially transversely of said first axis;
   a first drive means operatively engaging said indicator to cause selective displacement of said indicator along said first axis;
   a second drive means operatively engaging said indicator to cause selective displacement of said indicator along said second axis;
   signal source means connected to supply an oscillating excitation signal to each of said first and second drive means;
   each of said drive means being operative in response to said excitation signal to impart to said indicator a component of reciprocating motion directed along the said axis associated with that drive means and of a desired frequency, the amplitude of the reciprocating motion component imparted by each drive means being a function of the excitation signal amplitude supplied to such drive means;
   first modulating means operative in response to a first input signal undergoing examination to control the amplitude of said excitation signal supplied to said first drive means; and
   second modulating means operative in response to a second input signal undergoing examination to control the amplitude of said excitation signal supplied to said second drive means;
   so that the resultant motion imparted to said indicator is a function of and provides a comparison of said first and second input signals.

6. Apparatus as in claim 5, wherein said excitation signal has a frequency of within the range of approximately 15 to 20 cycles per second, inclusive.

7. Apparatus as in claim 5, further comprising phase changing means connected to cause selective variation of the relative phase relationship of said excitation signal supplied to one of said drive means relative to said excitation signal supplied to the other of said drive means.

8. Apparatus as in claim 7, wherein said excitation signal has a frequency within the range of approximately 15 to 20 cycles per second, inclusive.

9. Apparatus as in claim 5, wherein:
   each of said first and second drive means is operative in response to the modulated excitation signal supplied thereto to impart reciprocating displacement to said indicator; with
   said first drive means imparting said reciprocating displacement along said first axis and said second drive means imparting said reciprocating displacement along said second axis.

10. Apparatus as in claim 5, further comprising:
    a third drive means operatively engaging said indicator to cause selective displacement of said indicator along a third axis of movement;

said third axis having a predetermined angular relationship with respect to said first and second axes;
said third axis being skewed with respect to said first and second axes and lying outside a plane defined by said first and second axes;
said third drive means connected to receive said oscillating excitation signal from said signal source means;
third modulating means operative in response to a third input signal undergoing examination to control the amplitude of said excitation signal supplied to said third drive means; and
each of said drive means being operative in response to the modulated excitation signal supplied thereto to impart to said indicator a reciprocating displacement along the respective one of said axes associated with such drive means.

References Cited

UNITED STATES PATENTS

| 1,156,413 | 10/1915 | Lincoln | 324—143 X |
| 1,797,007 | 3/1931 | Mann | 324—143 |
| 2,312,336 | 3/1943 | Holliday | 324—140 X |
| 2,406,016 | 8/1946 | Heising | 324—143 X |

RUDOLPH V. ROLINEC, *Primary Examiner.*

A. E. SMITH, *Assistant Examiner.*

U.S. Cl. X.R.

324—83; 340—268

UNITED STATES PATENT OFFICE
CERTIFICATE OF CORRECTION

Patent No. 3,432,749 March 11, 1969

Douglas A. Kohl

It is certified that error appears in the above identified patent and that said Letters Patent are hereby corrected as shown below:

Column 4, line 7, "will reciprocate the ball 16′ along the longi-" and insert -- . When these three units 22a′, b′ and c′ are --; line 8, "recipracate" should read -- reciprocate --.

Signed and sealed this 14th day of April 1970.

(SEAL)
Attest:

Edward M. Fletcher, Jr.
Attesting Officer

WILLIAM E. SCHUYLER, JR.
Commissioner of Patents